United States Patent
Yamamura

(10) Patent No.: US 10,760,509 B2
(45) Date of Patent: Sep. 1, 2020

(54) ENGINE SYSTEM

(71) Applicant: HONDA MOTOR CO., LTD., Tokyo (JP)

(72) Inventor: Yoichi Yamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/559,862

(22) Filed: Sep. 4, 2019

(65) Prior Publication Data
US 2019/0390618 A1  Dec. 26, 2019

Related U.S. Application Data

(63) Continuation of application No. PCT/JP2017/041221, filed on Nov. 16, 2017.

(30) Foreign Application Priority Data

Apr. 4, 2017 (JP) ................................ 2017-074714

(51) Int. Cl.
*F02D 41/00* (2006.01)
*F02D 41/06* (2006.01)
(Continued)

(52) U.S. Cl.
CPC ......... *F02D 41/009* (2013.01); *F02D 41/062* (2013.01); *F02N 3/02* (2013.01); *F02N 99/002* (2013.01)

(58) Field of Classification Search
CPC ........ F02D 41/009; F02D 41/062; F02N 3/02; F02N 99/002; F02N 99/004;
(Continued)

(56) References Cited

U.S. PATENT DOCUMENTS 6,868,832 B2    3/2005  Tamechika et al.
7,930,092 B2 *  4/2011  Tokugawa ............. F02D 37/02
                                            123/179.1
(Continued)

FOREIGN PATENT DOCUMENTS

JP   11-22576 A    1/1999
JP   2002-21624 A  1/2002
(Continued)

OTHER PUBLICATIONS

International Search Report dated Feb. 6, 2018, issued in counterpart International Application No. PCT/JP2017/041221 (6 pages, includng continuation and extra sheets).

*Primary Examiner* — Sizo B Vilakazi
*Assistant Examiner* — Anthony L Bacon
(74) *Attorney, Agent, or Firm* — Westerman, Hattori, Daniels & Adrian, LLP

(57) ABSTRACT

A system includes a fuel tank, an internal combustion engine, a generator, a recoil starter, a control unit, an injector, a fuel pump, an igniter, and a detection unit that detects the crank angle of the internal combustion engine. The control unit, in a starting period of the internal combustion engine, which is started using the recoil starter, supplies electric power to the igniter, the injector, and the fuel pump such that a power supply period of the igniter will not overlap a power supply period of the injector and the fuel pump, using the crank angle as a reference.

9 Claims, 4 Drawing Sheets

| CRANK STATE | CRANK ANGLE | SUPPLY POWER TO IGNITION | SUPPLY POWER TO INJECTOR | SUPPLY POWER TO PUMP |
|---|---|---|---|---|
| 1 | BTDC145.5=<θ<BTDC115.5 | DO NOT ALLOW | ALLOW | ALLOW |
| 2 | BTDC115.5=<θ<BTDC85.5 | DO NOT ALLOW | ALLOW | ALLOW |
| 3 | BTDC85.5=<θ<BTDC55.5 | ALLOW | DO NOT ALLOW | DO NOT ALLOW |
| 4 | BTDC55.5=<θ<BTDC25.5 | ALLOW | DO NOT ALLOW | DO NOT ALLOW |
| 5 | BTDC25.5=<θ<ATDC4.5 | ALLOW | DO NOT ALLOW | DO NOT ALLOW |
| 6 | ATDC4.5=<θ<ATDC34.5 | ALLOW | DO NOT ALLOW | DO NOT ALLOW |
| 7 | ATDC34.5=<θ<ATDC64.5 | DO NOT ALLOW | DO NOT ALLOW | ALLOW |
| 8 | ADTC64.5=<θ<ATDC94.5 | DO NOT ALLOW | ALLOW | ALLOW |
| 9 | ATDC94.5=<θ<BOLT145.5 | DO NOT ALLOW | ALLOW | ALLOW |
| 10 | BOLT145.5=<θ<BOLT115.5 | DO NOT ALLOW | ALLOW | ALLOW |
| 11 | BOLT115.5=<θ<BOLT85.5 | DO NOT ALLOW | ALLOW | ALLOW |
| 12 | BOLT85.5=<θ<BOLT55.5 | ALLOW | DO NOT ALLOW | DO NOT ALLOW |
| 13 | BOLT55.5=<θ<BOLT25.5 | ALLOW | DO NOT ALLOW | DO NOT ALLOW |
| 14 | BOLT25.5=<θ<AOLT4.5 | ALLOW | DO NOT ALLOW | DO NOT ALLOW |
| 15 | AOLT4.5=<θ<AOLT34.5 | ALLOW | DO NOT ALLOW | DO NOT ALLOW |
| 16 | AOLT34.5=<θ<AOLT64.5 | DO NOT ALLOW | DO NOT ALLOW | ALLOW |
| 17 | AOLT64.5=<θ<AOLT94.5 | DO NOT ALLOW | ALLOW | ALLOW |
| 18 | AOLT94.5=<θ<BTDC145.5 | DO NOT ALLOW | ALLOW | ALLOW |

(51) Int. Cl.
 *F02N 3/02* (2006.01)
 *F02N 99/00* (2010.01)
(58) Field of Classification Search
 CPC ............ F02N 99/006; F02N 2200/021; F02N 2250/00; F02N 2300/10; F02N 2300/30
 See application file for complete search history.

(56) References Cited

U.S. PATENT DOCUMENTS

| | | | | |
|---|---|---|---|---|
| 8,746,198 | B2* | 6/2014 | Sasaki | .................. F02D 33/003 |
| | | | | 123/179.17 |
| 2004/0025839 | A1 | 2/2004 | Kashibata et al. | |
| 2005/0005914 | A1 | 1/2005 | Tamechika et al. | |
| 2007/0028898 | A1 | 2/2007 | Namari et al. | |
| 2009/0183707 | A1* | 7/2009 | Sasaki | .................. F02D 41/062 |
| | | | | 123/179.17 |
| 2009/0192697 | A1* | 7/2009 | Sasaki | ..................... F02P 7/077 |
| | | | | 701/105 |
| 2009/0198436 | A1* | 8/2009 | Sasaki | ....................... F02N 3/04 |
| | | | | 701/103 |
| 2011/0220068 | A1* | 9/2011 | Ferch | ..................... F02D 17/02 |
| | | | | 123/481 |
| 2012/0291764 | A1* | 11/2012 | Sato | ..................... F02P 5/1558 |
| | | | | 123/612 |

FOREIGN PATENT DOCUMENTS

| | | |
|---|---|---|
| JP | 2004-68792 A | 3/2004 |
| JP | 2005-30250 A | 2/2005 |
| JP | 2007-40252 A | 2/2007 |
| JP | 4159040 B2 | 10/2008 |
| JP | 2014-185611 A | 10/2014 |

* cited by examiner

FIG. 4

| CRANK STATE | CRANK ANGLE | SUPPLY POWER TO IGNITION | SUPPLY POWER TO INJECTOR | SUPPLY POWER TO PUMP |
|---|---|---|---|---|
| 1 | BTDC145.5=<θ<BTDC115.5 | DO NOT ALLOW | ALLOW | ALLOW |
| 2 | BTDC115.5=<θ<BTDC85.5 | DO NOT ALLOW | ALLOW | ALLOW |
| 3 | BTDC85.5=<θ<BTDC55.5 | ALLOW | DO NOT ALLOW | DO NOT ALLOW |
| 4 | BTDC55.5=<θ<BTDC25.5 | ALLOW | DO NOT ALLOW | DO NOT ALLOW |
| 5 | BTDC25.5=<θ<ATDC4.5 | ALLOW | DO NOT ALLOW | DO NOT ALLOW |
| 6 | ATDC4.5=<θ<ATDC34.5 | ALLOW | DO NOT ALLOW | DO NOT ALLOW |
| 7 | ATDC34.5=<θ<ATDC64.5 | DO NOT ALLOW | DO NOT ALLOW | ALLOW |
| 8 | ADTC64.5=<θ<ATDC94.5 | DO NOT ALLOW | ALLOW | ALLOW |
| 9 | ATDC94.5=<θ<BOLT145.5 | DO NOT ALLOW | ALLOW | ALLOW |
| 10 | BOLT145.5=<θ<BOLT115.5 | DO NOT ALLOW | ALLOW | ALLOW |
| 11 | BOLT115.5=<θ<BOLT85.5 | DO NOT ALLOW | ALLOW | ALLOW |
| 12 | BOLT85.5=<θ<BOLT55.5 | ALLOW | DO NOT ALLOW | DO NOT ALLOW |
| 13 | BOLT55.5=<θ<BOLT25.5 | ALLOW | DO NOT ALLOW | DO NOT ALLOW |
| 14 | BOLT25.5=<θ<AOLT4.5 | ALLOW | DO NOT ALLOW | DO NOT ALLOW |
| 15 | AOLT4.5=<θ<AOLT34.5 | ALLOW | DO NOT ALLOW | DO NOT ALLOW |
| 16 | AOLT34.5=<θ<AOLT64.5 | DO NOT ALLOW | DO NOT ALLOW | ALLOW |
| 17 | AOLT64.5=<θ<AOLT94.5 | DO NOT ALLOW | ALLOW | ALLOW |
| 18 | AOLT94.5=<θ<BTDC145.5 | DO NOT ALLOW | ALLOW | ALLOW |

ENGINE SYSTEM

CROSS-REFERENCE TO RELATED APPLICATIONS

This application is a continuation of International Patent Application No. PCT/JP2017/041221 filed on Nov. 16, 2017, which claims priority to and the benefit of Japanese Patent Application No. 2017-074714 filed on Apr. 4, 2017, the entire disclosures of which are incorporated herein by reference.

TECHNICAL FIELD

The present invention relates to an electronic fuel injection control system and an engine system.

BACKGROUND ART

An engine system that generates electric power by driving a generator using an internal combustion engine is a useful power supply in regions in which the use of electric power grids is not wide spread, or when a commercial power supply is interrupted. According to Patent Literature 1, providing a back-up battery is proposed in order to supplement electric power that is insufficient when an engine system including a recoil starter, which is a manual operation type engine starter apparatus, is started.

CITATION LIST

Patent Literature

PTL 1: Japanese Patent No. 4159040

SUMMARY OF INVENTION

Technical Problem

With the method disclosed in Patent Literature 1, electric power sufficient for an electronic fuel injection apparatus is supplied by providing a back-up battery. However, as a result of providing the back-up battery, the manufacturing cost of the engine system increases. Also, if the charge amount of the back-up battery is not sufficient, the engine cannot be started. Therefore, the present invention aims to provide an engine system in which it is possible to reduce the power consumed when starting the engine.

Solution to Problem

According to the present invention, a batteryless engine system can be provided, for example. The batteryless engine system includes: a fuel tank for containing fuel; an internal combustion engine; a generator that is driven by the internal combustion engine and produces electric power; a recoil starter for starting the internal combustion engine; a control unit that operates by receiving electric power generated by the generator; an injector that operates by receiving electric power generated by the generator, is controlled by the control unit, and supplies fuel to the internal combustion engine; a fuel pump that operates by receiving electric power generated by the generator, is controlled by the control unit, and supplies fuel contained in the fuel tank to the injector; an igniter that ignites fuel compressed in the internal combustion engine; and a detection unit that detects the crank angle of the internal combustion engine, wherein the control unit, in a starting period of the internal combustion engine, which is started using the recoil starter, supplies electric power to the igniter, the injector, and the fuel pump such that a power supply period of the igniter will not overlap a power supply period of the injector and the fuel pump, using the crank angle as a reference.

Advantageous Effects of Invention

According to the present invention, an engine system can be provided in which it is possible to reduce the power consumed when starting the engine.

Other features and advantages of the present invention will be apparent from the following description taken in conjunction with the accompanying drawings. Note that the same reference numerals denote the same or similar components throughout the accompanying drawings.

BRIEF DESCRIPTION OF DRAWINGS

The accompanying drawings are included in the description, constitute part thereof, show embodiments of the present invention, and are used, together with the descriptions thereof, to explain the concept of the present invention.

FIG. 4 is a diagram illustrating a mapping table.

DESCRIPTION OF EMBODIMENTS

Engine System

Figure 1:
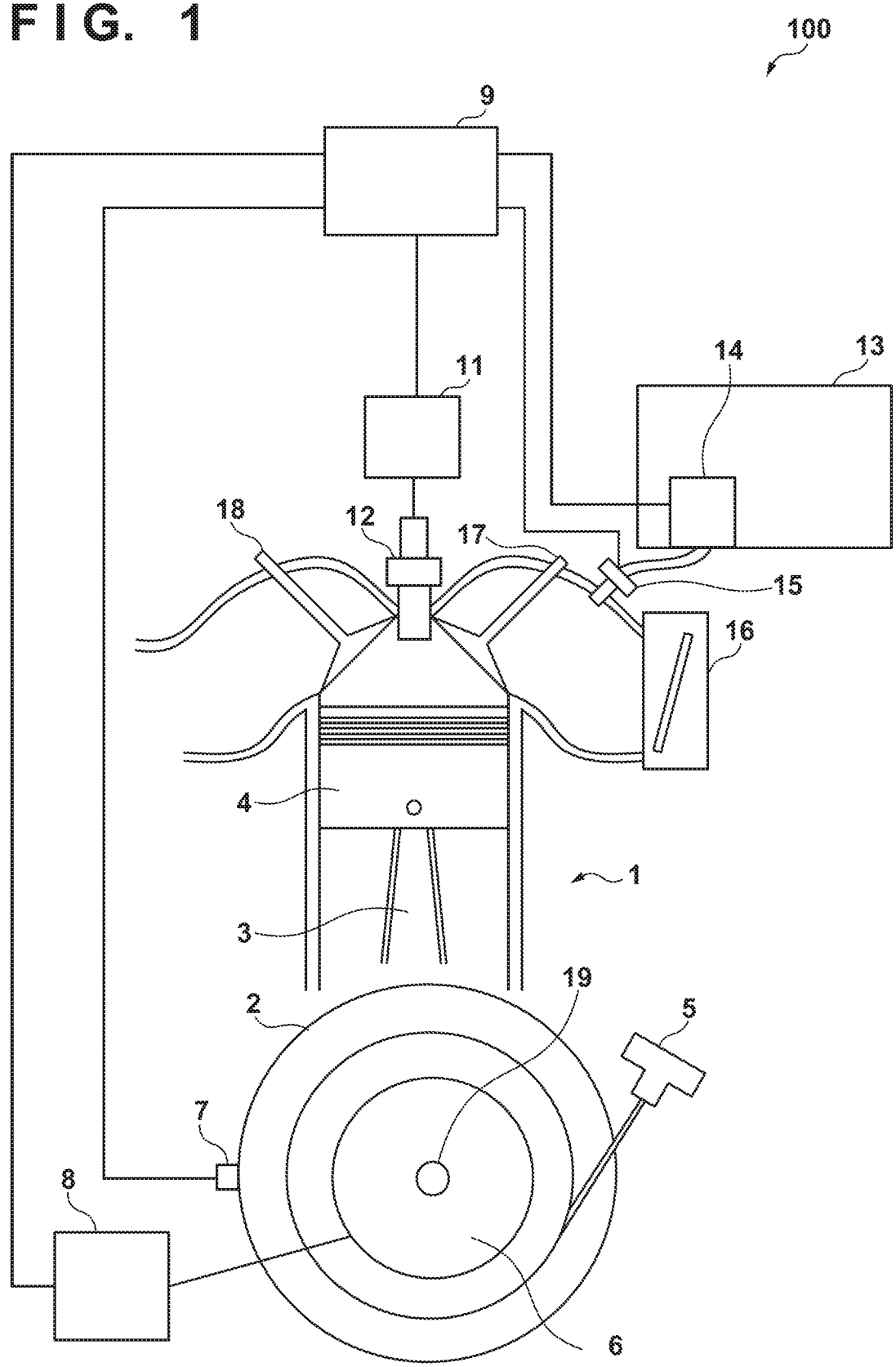
FIG. 1 is a schematic diagram illustrating an engine system.

FIG. 1 is a schematic diagram illustrating a batteryless engine system 100. The engine system 100 may also be referred to as an electronic fuel injection control system. An internal combustion engine 1 is a four-stroke-type engine. A crank shaft 19 is housed in a crankcase 2. As a result of the crank shaft 19 rotating, a piston 4 coupled to a connecting rod 3 is brought into vertical motion inside a cylinder. A recoil starter 5 for starting the internal combustion engine 1 is coupled to the crank shaft 19. A recoil operator causes the crank shaft 19 to rotate by grasping and pulling a grip of the recoil starter 5. A generator 6 is coupled to the crank shaft 19, and as a result of the crank shaft 19 rotating, a rotor of the generator 6 rotates, and the generator 6 generates electric power. The crank angle of the crank shaft 19 is detected by a crank angle sensor 7. The crank angle sensor 7 may be a Hall element that detects the magnetism of a magnet provided in a flywheel coupled to the crank shaft 19, for example. The power supply circuit 8 includes a circuit that converts an alternating current generated by the generator 6 to a direct current, a circuit that shift the level of a DC voltage, and the like. The power supply circuit 8 supplies electric power generated by the generator 6 to a control unit 9. Note that, when the crank shaft 19 is rotated by the recoil starter 5, the generator 6 generates electric power that is sufficient for the control unit 9 to operate. The control unit 9 is an engine control unit (ECU), and controls electric power to be supplied from the power supply circuit 8 to an igniter 11, a fuel pump 14, an injector 15, a throttle motor 16, and the like. The igniter 11 supplies ignition power for causing the ignition plug 12 to spark-discharge. A fuel tank 13 is a container that contains fuel. The fuel pump 14 is a pump for supplying fuel contained in the fuel tank 13 to the injector 15. In FIG. 1, the fuel pump 14 is provided inside the fuel tank. The throttle motor 16 is a motor for controlling an air inflow amount. An intake valve 17 is a valve that is opened/closed by a cam or the like that converts a rotational motion of the crank shaft 19 into vertical motion. The intake valve 17 opens in an intake stroke, and is basically closed in a compression stroke, an expansion stroke, and an exhaust stroke. An exhaust valve 18 is a valve that is opened/closed by a cam or the like that converts rotational motion of the crank shaft 19 into vertical motion. The exhaust valve 18 opens in the exhaust stroke, and is basically closed in the compression stroke, the expansion stroke, and the intake stroke. A period may be provided in which both the intake valve 17 and the exhaust valve 18 are open at the same time in order to make the transition from exhaust to intake smooth (overlap).

Incidentally, the total value of power consumption of the control unit 9, the fuel pump 14, the igniter 11, and the injector 15 may reach several tens of watts. If this electric power is supplied only by the generator 6 without using a back-up battery, a large recoil power is needed. That is, the recoil operator is required to perform a heavy physical task. Alternatively, there may be cases where sufficient electric power cannot be supplied with only the recoil starter 5. Therefore, in this example, in a starting period of the internal combustion engine 1, which is started using the recoil starter 5, the control unit 9 supplies electric power to the igniter 11, the injector 15, and the fuel pump 14 such that, using the crank angle as a reference, the power supply period of the igniter 11 will not overlap the power supply period of the injector 15 and the fuel pump 14. Accordingly, because the electric power needed in a starting period can be reduced, it is possible to reduce the power required by the recoil operator.

Control Unit and Power Supply Circuit

Figure 2:
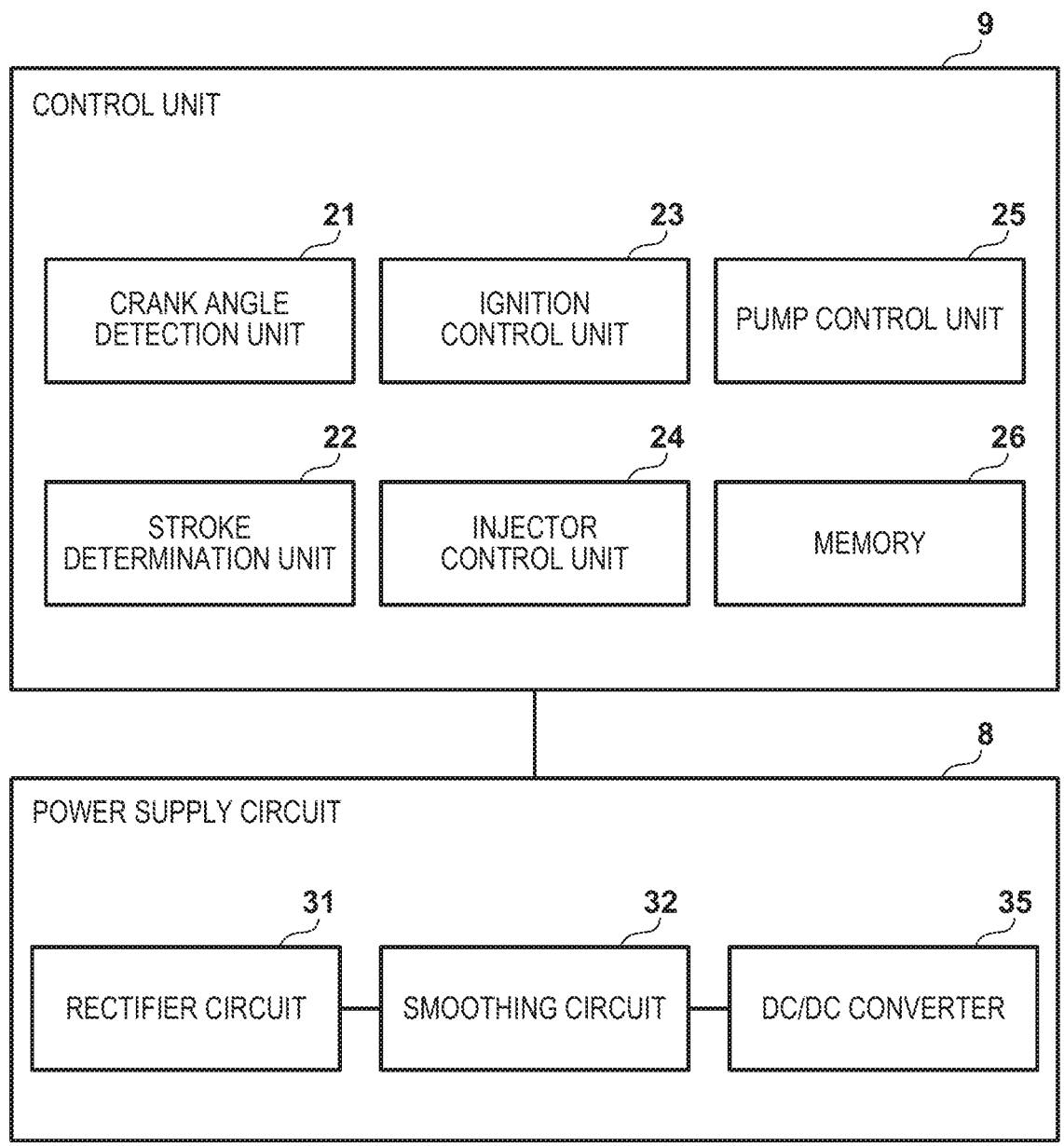
FIG. 2 is a block diagram illustrating a control unit and a power supply circuit.

FIG. 2 shows the functions of the control unit 9 and the power supply circuit 8. In the control unit 9, a crank angle detection unit 21 detects the crank angle based on the intervals of pulse signals output from the crank angle sensor 7. The crank angle detection unit 21 detects a top dead center (TDC) as 0 degrees. In a four stroke engine, the crank angle is assumed to take a value in a range from 0 degrees to 720 degrees. Note that, the angle in a stroke before TDC may be denoted by BTDC, and the angle in a stroke after TDC may be denoted by ATDC, TDC being the reference. Also, the angle in a stroke before an overlap top (OLT), which is a top dead center in the exhaust stroke, may be denoted by BOLT, and the angle in a stroke after OLT may be denoted by AOLT. A stroke determination unit 22 determines the stroke of the internal combustion engine 1 based on the intervals of pulse signals output from the crank angle sensor 7. For example, the stroke determination unit 22 recognizes the period corresponding to two rotations (720 degrees) of the crank shaft 19 as 18 crank states. An ignition control unit 23 controls whether or not power is supplied to the igniter 11 in accordance with the crank angle detected by the crank angle detection unit 21. Information (mapping table) indicating enabling and disabling the supply of power to the igniter 11 in correspondence with the crank angle may be stored in a memory 26. An injector control unit 24 controls whether or not power is supplied to the injector 15 in accordance with the crank angle detected by the crank angle detection unit 21. Information (mapping table) indicating enabling and disabling the supply of power to the injector 15 in correspondence with the crank angle may be stored in the memory 26. A pump control unit 25 controls whether or not power is supplied to the fuel pump 14 in accordance with the crank angle detected by the crank angle detection unit 21. Information (mapping table) indicating enabling and disabling the supply of power to the fuel pump 14 in correspondence with the crank angle may be stored in the memory 26. The crank state determined by the stroke determination unit 22 may be used instead of the crank angle detected by the crank angle detection unit 21.

The amount of fuel needed by the internal combustion engine 1 depends on the size of a load that operates with electric power supplied from the engine system 100. Therefore, the pump control unit 25 may perform PWM control with respect to the period during which electric power is supplied to the fuel pump 14 in accordance with the size of the load. That is, the length of an ON period (on-duty) of a pulse-like drive signal that is supplied to the fuel pump 14 may be variably controlled according to the size of the load. The memory 26 is a storage apparatus including a RAM, a ROM, and the like.

In the power supply circuit 8, a rectifier circuit 31 is a circuit for rectifying an alternating current generated by the generator 6. A smoothing circuit 32 is a circuit for generating a direct current by smoothing a pulsating current generated by the rectifier circuit 31. With this, a 12 V DC voltage is generated, for example. A DC/DC converter 35 is a circuit for shifting the level of the DC voltage. For example, the DC/DC converter 35 converts a 12 V DC voltage to a 5 V or 3.3 V DC voltage.

Crank State

Figure 3:
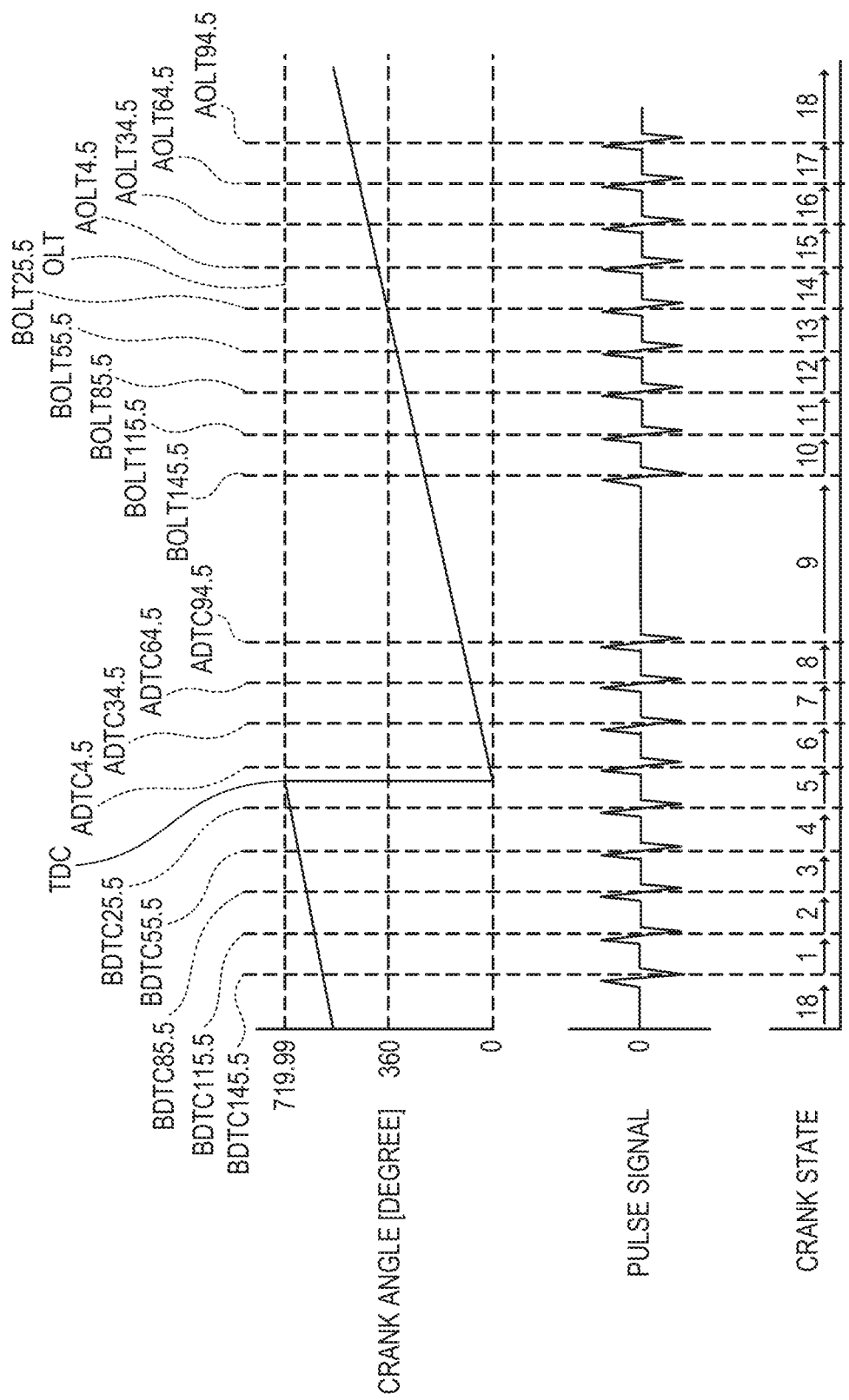
FIG. 3 is a diagram illustrating the relationship between pulse signals, crank states, and crank angles.

FIG. 3 shows the relationship between pulse signals output by the crank angle sensor 7, crank states, and crank angles. The stroke determination unit 22 uses the falling of a pulse signal output by the crank angle sensor 7 as the reference timing of control. As FIG. 3 shows, the crank angle sensor 7 outputs nine pulse signals while the crank shaft 19 rotates 360 degrees. Here, magnets are arranged such that, although the intervals of adjacent pulse signals with respect to first to ninth pulse signals are the same, the interval between the ninth and tenth pulses is relatively long. For example, assume that nine magnets are arranged at intervals of 30 degrees, and the interval between a ninth magnet and a first magnet is 120 degrees. That is, the interval between the ninth magnet and the first magnet is four times the normal interval. The stroke determination unit 22 measures the pulse intervals using a timer and a counter, compares two adjacent pulse intervals, and determines that the pulse signal generated after a relatively long interval is the start of a provisional crank state 1. For example, if an $i^{th}$ pulse interval is twice an $(i-1)^{th}$ pulse interval or more, the stroke determination unit 22 determines that the $(i+1)^{th}$ pulse interval is a provisional crank state 1. Thereafter, every time a pulse signal is input, the stroke determination unit 22 increments the number of the crank state by one. With this, while the crank shaft 19 rotates 720 degrees, provisional crank states 1 to 18 are assigned. Here, the stroke determination unit 22 determines whether or not the pulse interval in a provisional crank state 4 is longer than the pulse interval in a provisional crank state 13. The original crank state 4 is a state before ignition in the compression stroke, and the angular velocity of the crank shaft 19 is slowest, and as a result, the pulse interval is longer than the pulse interval in the crank state 13. Therefore, if the pulse interval in the provisional crank state 4 is longer than the pulse interval in the provisional crank state 13, the stroke determination unit 22 determines that the determination of the crank state is correct. On the other hand, if the pulse interval in the provisional crank state 4 is not longer than the pulse interval in the provisional crank state 13, the provisional crank state 13 corresponds to the original crank state 4. Therefore, if the pulse interval in the provisional crank state 4 is not longer than the pulse interval in the provisional crank state 13, the stroke determination unit 22 determines that the crank states are shifted by nine states. That is, the stroke determination unit 22 determines the original crank states by shifting the respective provisional crank states by nine states. The crank angle detection unit 21 recognizes that the falling of a pulse signal that comes after the original crank state 18 is BDTC 145.5 degrees, and manages the crank angle using this angle as a reference.

Here, the crank angle is managed and monitored using the crank state, but the crank angle detection unit 21 may detect the crank angle (0 degrees to 720 degrees) from a rotation angle (0 degrees to 360 degrees) based on a pulse signal output by the crank angle sensor 7 and a rotation angle (0 degrees to 360 degrees) of a cam that drives the intake valve 17. Note that, in this case, a sensor for detecting the rotation angle of the cam that drives the intake valve 17 is needed.

Power Supply Control

In an operation period in which the internal combustion engine 1 performs self-sustaining operation, the original crank state can be determined using the above-described method. However, in a starting period of the internal combustion engine 1, there may be cases where, although provisional crank states can be determined, the original crank states cannot be determined. This is because, in a starting period of the internal combustion engine 1, the pulse interval of the crank state 4 does not significantly differ from the pulse interval of the crank state 13. Therefore, in this embodiment, the control unit 9 performs ignition in the vicinity of the top dead center regardless of whether being at TDC or OLT, and causes the injector 15 and the fuel pump 14 to operate before ignition. This means that the crank states 1 to 9 are not differentiated from the crank states 10 to 18.

FIG. 4 shows a mapping table for a starting period that is held in the memory 26. The control unit 9 acquires a control condition corresponding to the crank angle acquired by the crank angle detection unit 21 or the crank state determined by the stroke determination unit 22, from the mapping table. For example, in the crank states 1 and 2, the control unit 9 does not supply electric power to the igniter 11, but supplies electric power to the fuel pump 14 and the injector 15. That is, the ignition control unit 23 does not supply electric power to the igniter 11 according to the mapping table. The pump control unit 25 supplies electric power to the fuel pump 14 according to the mapping table. The injector control unit 24 also supplies electric power to the injector 15 according to the mapping table. As described above, electric power is supplied to the fuel pump 14 while receiving PWM control, but the size of the load is unknown in the starting period. Therefore, the pump control unit 25 generates the PWM signal having an on-duty for the starting period, and supplies the PWM signal to the fuel pump 14. In this way, in the crank states 1 and 2, fuel is supplied to the cylinder of the internal combustion engine 1, and compression is performed. As described above, in the crank states 1 and 2 in the starting period, the control unit 9 supplies electric power to the igniter 11, the injector 15, and the fuel pump 14 such that the power supply period of the igniter 11 does not overlap the power supply period of the injector 15 and the fuel pump 14.

In the crank states 3 to 6, the ignition control unit 23 supplies electric power to the igniter 11 according to the mapping table. With this, the igniter 11 supplies electric power to the ignition plug 12, and causes the ignition plug 12 to conduct discharge. In the crank states 3 to 6, the injector control unit 24 also does not supply electric power to the injector 15, according to the mapping table. Similarly, the pump control unit 25 does not supply electric power to the fuel pump 14, according to the mapping table. In this way, in the crank states 3 to 6 in the starting period as well, the control unit 9 supplies electric power to the igniter 11, the injector 15, and the fuel pump 14 such that the power supply period of the igniter 11 does not overlap the power supply period of the injector 15 and the fuel pump 14.

In the crank state 7, the ignition control unit 23 does not supply electric power to the igniter 11, according to the mapping table. The injector control unit 24 also does not supply electric power to the injector 15, according to the mapping table. However, the pump control unit 25 supplies electric power to the fuel pump 14, according to the mapping table. A large amount of fuel is needed in the starting period. Therefore, as a result of causing the fuel pump 14 to operate earlier than the injector 15, sufficient fuel can be supplied to the injector 15.

In the crank states 8 to 11, the ignition control unit 23 does not supply electric power to the igniter 11, according to the mapping table. The injector control unit 24 also supplies electric power to the injector 15, according to the mapping table. The pump control unit 25 also supplies electric power to the fuel pump 14, according to the mapping table. The crank states 8 to 11 in the operation period correspond to the expansion stroke and the exhaust stroke, but the provisional crank states 8 to 11 in the starting period may not be these strokes. That is, it is possible that the provisional crank states 8 to 11 correspond to the original intake and compression strokes. Therefore, fuel is supplied in the provisional crank states 8 to 11 as well. Note that, in the crank states 8 to 11 in the starting period as well, the control unit 9 supplies electric power to the igniter 11, the injector 15, and the fuel pump 14 such that the power supply period of the igniter 11 does not overlap the power supply period of the injector 15 and the fuel pump 14.

In the crank states 12 to 15, the ignition control unit 23 supplies electric power to the igniter 11, according to the mapping table. The injector control unit 24 does not supply electric power to the injector 15, according to the mapping table. Similarly, the pump control unit 25 does not supply electric power to the fuel pump 14, according to the mapping table. In this way, in the crank states 12 to 15 in the starting period as well, the control unit 9 supplies electric power to the igniter 11, the injector 15, and the fuel pump 14 such that the power supply period of the igniter 11 does not overlap the power supply period of the injector 15 and the fuel pump 14.

In the crank state 16, the ignition control unit 23 does not supply electric power to the igniter 11, according to the mapping table. The injector control unit 24 also does not supply electric power to the injector 15, according to the mapping table. However, the pump control unit 25 supplies electric power to the fuel pump 14, according to the mapping table.

In the crank states 17 and 18, the ignition control unit 23 does not supply electric power to the igniter 11, according to the mapping table. The injector control unit 24 supplies electric power to the injector 15, according to the mapping table. The pump control unit 25 also supplies electric power to the fuel pump 14, according to the mapping table. In this way, in the crank states 16 to 18 in the starting period as well, the control unit 9 supplies electric power to the igniter 11, the injector 15, and the fuel pump 14 such that the power supply period of the igniter 11 does not overlap the power supply period of the injector 15 and the fuel pump 14.

As FIG. 4 shows, in the starting period, the control unit 9 supplies electric power to the igniter 11, the injector 15, and the fuel pump 14 such that the power supply period of the igniter 11 does not overlap the power supply period of the injector 15 and the fuel pump 14. With this, it is possible to reduce the power consumed in the starting period. As a result of reducing the power consumed in the starting period, the power supply circuit 8 can be made compact. For example, because the back-up battery and the charging circuit thereof are no longer necessary, the power supply circuit 8 can be made compact.

Note that, when the number-of-rotations of the internal combustion engine 1 has stabilized, the control unit 9 switches the mapping table from the mapping table for a starting period to a mapping table for an operation period, and controls supply of electric power to the igniter 11, the injector 15, and the fuel pump 14. In particular, in the operation period, the pump control unit 25 may supply electric power to the fuel pump 14 by generating a PWM signal having an on-duty in accordance with the size of the load. That is, when the level of the PWM signal indicates ON, the power supply circuit 8 supplies electric power to the fuel pump 14, and when the level of the PWM signal indicates OFF, the power supply circuit 8 does not supply electric power to the fuel pump 14. With this, an amount of fuel in accordance with the size of the load can be appropriately supplied to the internal combustion engine 1.

Summary

According to this embodiment, the injector 15 is an example of a fuel injection apparatus that operates by receiving electric power generated by the generator 6, is controlled by the control unit 9, and supplies fuel to the internal combustion engine 1. The fuel pump 14 is an example of a fuel pump that operates by receiving electric power generated by the generator 6, is controlled by the control unit 9, and supplies fuel contained in the fuel tank 13 to the injector 15. The igniter 11 is an example of an igniter that ignites fuel compressed in the internal combustion engine 1. The crank angle sensor 7 is an example of a detection unit that detects the crank angle of the internal combustion engine 1. The control unit 9, in a starting period of the internal combustion engine 1, which is started by the recoil starter 5, supplies electric power to the igniter 11, the injector 15, and the fuel pump 14 such that the power supply period of the igniter 11 will not overlap the power supply period of the injector 15 and the fuel pump 14, using the crank angle as a reference. With this, it is possible to reduce the power consumed in a starting period. As a result, the back-up battery and the charging circuit thereof are no longer necessary, and the engine system 100 can be made compact. Also, a problem such as an engine system being unable to be started due to the back-up battery being insufficiently charged will not occur in this embodiment.

The control unit 9 may perform PWM control with respect to electric power to be supplied to the fuel pump 14. With this, the power consumption of the fuel pump 14 can be reduced, and it is possible to reduce the amount of heat generated by the fuel pump 14. The control unit 9 may, in a starting period of the internal combustion engine 1, perform PWM control with respect to electric power to be supplied to the fuel pump 14 in accordance with an amount of fuel needed to start the internal combustion engine 1. Note that the control unit 9 can calculate the number-of-rotations of the internal combustion engine 1 from the length of the pulse period corresponding to the crank state 9 or 18. Also, the control unit 9 can distinguish between the starting period and the operation period from the degree of stability of the number-of-rotations. In the operation period of the internal combustion engine 1, the control unit 9 may perform PWM control with respect to electric power to be supplied to the fuel pump 14 in accordance with the load of the generator. With this, the power consumption of the fuel pump 14 in the operation period can be reduced, and it is possible to reduce the amount of heat generated by the fuel pump 14.

Incidentally, in the operation period of the internal combustion engine 1, the control unit 9 may perform PWM control with respect to electric power to be supplied to the fuel pump 14 in accordance with the load driven by the internal combustion engine 1. For example, when the internal combustion engine 1 is installed in an agricultural machine or the like, the load is a cultivating machine or the like connected to the agricultural machine. In this case, a sensor for detecting the size of the load driven by the internal combustion engine 1 (driving power needed by the cultivating machine, for example) may be provided as a load sensor. The control unit 9 may perform PWM control with respect to electric power to be supplied to the fuel pump 14 in accordance with the size of the load detected by the load sensor. The control unit 9 may start supplying power to the fuel pump 14 prior to supplying power to the injector 15. With this, the injector 15 can inject fuel at a high pressure from the start of the injection.

The fuel pump 14 may be provided inside the fuel tank. As described above, as a result of performing PWM control with respect to electric power to be supplied to the fuel pump 14, the heat generation of the fuel pump 14 can be suppressed, and the increase in temperature of the fuel inside the fuel tank can be suppressed. That is, even if the fuel pump 14 is provided inside the fuel tank 13 in order to reduce the size of the engine system 100, the fuel can be suppressed from boiling. Also, because the internal pressure of the fuel tank 13 can be suppressed from increasing, a resin material can be adopted as the material of the fuel tank 13 instead of metal. The fuel tank 13 made of resin has a large degree of freedom in shape, and therefore the overall structure of the engine system 100 will be greatly benefited therefrom. Also, because a resin fuel tank 13 is lighter than a metal fuel tank 13, it is possible to reduce the weight of the engine system 100. Also, because the amount of volatile substances generated from fuel decreases, it is possible to reduce the sizes of an evaporator and a canister.

So far, a description has been given focusing on the fact that control is performed such that the power supply period of the igniter 11 will not overlap the power supply period of the injector 15 and the fuel pump 14. However, the control unit 9 may perform PWM control with respect to electric power to be supplied to the fuel pump 14 in accordance with the load of the internal combustion engine 1 or the load of the generator 6. With this, it is possible to reduce the power consumption of the fuel pump 14.

The present invention is not limited to the above embodiments and various changes and modifications can be made within the spirit and scope of the present invention. Therefore, to apprise the public of the scope of the present invention, the following claims are made.

The invention claimed is:
1. A batteryless engine system comprising:
a fuel tank for containing fuel;
an internal combustion engine;
a generator that is driven by the internal combustion engine and produces electric power;

a recoil starter for starting the internal combustion engine;
a control unit that operates by receiving electric power generated by the generator;
an injector that operates by receiving electric power generated by the generator, is controlled by the control unit, and supplies fuel to the internal combustion engine;
a fuel pump that operates by receiving electric power generated by the generator, is controlled by the control unit, and supplies fuel contained in the fuel tank to the injector;
an igniter that ignites fuel compressed in the internal combustion engine; and
a detection unit that detects the crank angle of the internal combustion engine,
wherein the control unit is configured to control supplying electric power to the igniter, the injector and the fuel pump, in a starting period of the internal combustion engine, which is started using the recoil starter, such that:
when the crank angle detected by the detection unit is BTDC 145.5 or more and less than BTDC 85.5, supplying electric power to the igniter is not allowed, supplying electric power to the injector is allowed, and supplying electric power to the fuel pump is allowed;
when the crank angle detected by the detection unit is BTDC 85.5 or more and less than ATDC 34.5, supplying electric power to the igniter is allowed, supplying electric power to the injector is not allowed, and supplying electric power to the fuel pump is not allowed;
when the crank angle detected by the detection unit is ATDC 34.5 or more and less than ATDC 64.5, supplying electric power to the igniter is not allowed, supplying electric power to the injector is not allowed, and supplying electric power to the fuel pump is allowed;
when the crank angle detected by the detection unit is ATDC 64.5 or more and less than BOLT 85.5, supplying electric power to the igniter is not allowed, supplying electric power to the injector is allowed, and supplying electric power to the fuel pump is allowed;
when the crank angle detected by the detection unit is BOLT 85.5 or more and less than AOLT 34.5, supplying electric power to the igniter is allowed, supplying electric power to the injector is not allowed, and supplying electric power to the fuel pump is not allowed;
when the crank angle detected by the detection unit is AOLT 34.5 or more and less than AOLT 64.5, supplying electric power to the igniter is not allowed, supplying electric power to the injector is not allowed, and supplying electric power to the fuel pump is allowed; and
when the crank angle detected by the detection unit is AOLT 64.5 or more and less than BTDC 145.5, supplying electric power to the igniter is not allowed, supplying electric power to the injector is allowed, and supplying electric power to the fuel pump is allowed.

2. The batteryless engine system according to claim 1, wherein the control unit performs PWM control with respect to electric power to be supplied to the fuel pump.

3. The batteryless engine system according to claim 2, wherein the control unit, in a starting period of the internal combustion engine, performs PWM control with respect to electric power to be supplied to the fuel pump in accordance with an amount of fuel needed to start the internal combustion engine.

4. The batteryless engine system according to claim 2, wherein the control unit, in an operation period of the internal combustion engine, performs PWM control with respect to electric power to be supplied to the fuel pump in accordance with a load of the generator.

5. The batteryless engine system according to claim 4, further comprising:
a rectifier circuit that rectifies alternating current generated by the generator; and
a smoothing circuit that smoothes a pulsating current generated by the rectifier circuit and generates a direct current,
wherein the control unit performs PWM control with respect to electric power to be supplied to the fuel pump in accordance with a load of the generator.

6. The batteryless engine system according to claim 2, wherein the control unit, in an operation period of the internal combustion engine, performs PWM control with respect to electric power to be supplied to the fuel pump in accordance with a load driven by the internal combustion engine.

7. The batteryless engine system according to claim 1, wherein the control unit starts supplying power to the fuel pump prior to supplying power to the injector.

8. The batteryless engine system according to claim 1, wherein the fuel pump is provided inside the fuel tank.

9. A batteryless engine system comprising:
a fuel tank for containing fuel;
an internal combustion engine;
a generator that is driven by the internal combustion engine and produces electric power;
a recoil starter for starting the internal combustion engine;
a control unit that operates by receiving electric power generated by the generator;
an injector that operates by receiving electric power generated by the generator, is controlled by the control unit, and supplies fuel to the internal combustion engine;
a fuel pump that operates by receiving electric power generated by the generator, is controlled by the control unit, and supplies fuel contained in the fuel tank to the injector;
an igniter that ignites fuel compressed in the internal combustion engine; and
a detection unit that detects the crank angle of the internal combustion engine,
wherein the control unit is configured to control supplying electric power to the igniter, the injector and the fuel pump, in a starting period of the internal combustion engine, which is started using the recoil starter, such that:
when the crank angle detected by the detection unit is a first crank angle or more and less than a second crank angle, supplying electric power to the igniter is not allowed, supplying electric power to the injector is allowed, and supplying electric power to the fuel pump is allowed;
when the crank angle detected by the detection unit is the second crank angle or more and less than a third crank angle, supplying electric power to the igniter is allowed, supplying electric power to the injector is not allowed, and supplying electric power to the fuel pump is not allowed;
when the crank angle detected by the detection unit is the third crank angle or more and less than a fourth crank angle, supplying electric power to the igniter is not allowed, supplying electric power to the injector is not allowed, and supplying electric power to the fuel pump is allowed;

when the crank angle detected by the detection unit is the fourth crank angle or more and less than a fifth crank angle, supplying electric power to the igniter is not allowed, supplying electric power to the injector is allowed, and supplying electric power to the fuel pump is allowed;

when the crank angle detected by the detection unit is the fifth crank angle or more and less than a sixth crank angle, supplying electric power to the igniter is allowed, supplying electric power to the injector is not allowed, and supplying electric power to the fuel pump is not allowed;

when the crank angle detected by the detection unit is the sixth crank angle or more and less than a seventh crank angle, supplying electric power to the igniter is not allowed, supplying electric power to the injector is not allowed, and supplying electric power to the fuel pump is allowed; and when the crank angle detected by the detection unit is the seventh crank angle or more and less than the first crank angle, supplying electric power to the igniter is not allowed, supplying electric power to the injector is allowed, and supplying electric power to the fuel pump is allowed.

* * * * *